United States Patent Office 2,970,257
Patented Jan. 31, 1961

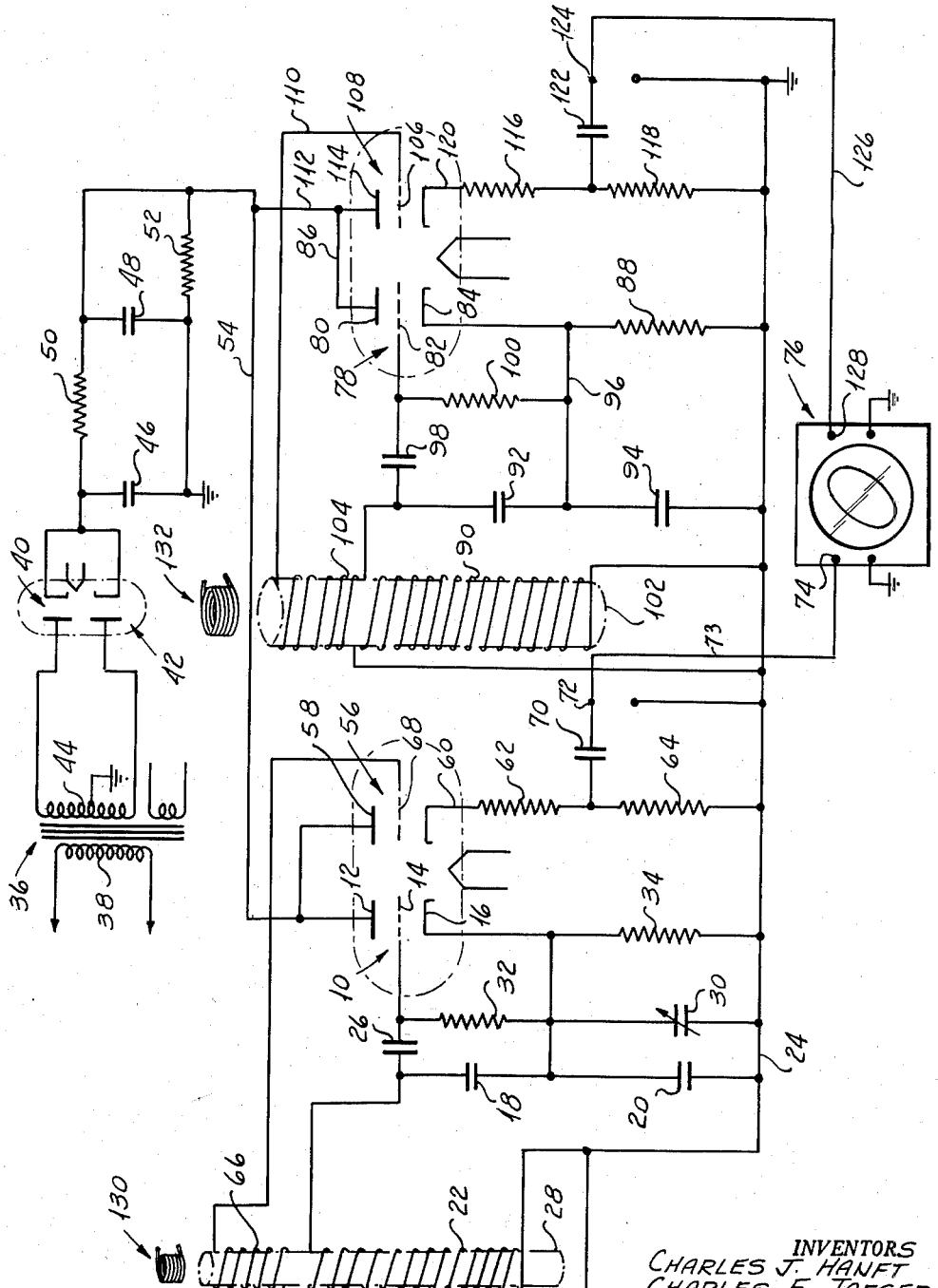

2,970,257
COIL TESTER

Charles J. Hanft, Jackson Heights, and Charles F. Jaeger, Yorktown Heights, N.Y., assignors, by mesne assignments, to United Aircraft Corporation, East Hartford, Conn., a corporation of Delaware Filed Mar. 26, 1957, Ser. No. 648,599
4 Claims. (Cl. 324—51)

Our invention relates to a coil tester and more particularly to an improved coil tester which is more sensitive than coil testers of the prior art.

In the manufacture of pickup and torquing coils for use in gyroscope systems, it is necessary that the coils be tested both for shorted turns in their windings and for open circuits in their windings. In the usual control devices these coils are made of fine wire which may, for example, be as small as No. 40 wire. We have discovered that the coil testing devices known in the art are not sufficiently sensitive to detect defects which would render these coils inoperative for the purpose for which they are designed. For example, in these coils it is necessary that even a single shorted turn of No. 40 wire be detected by the coil tester.

We have invented a coil tester which is more sensitive than coil testers known in the prior art. Our tester may, for example, detect a single shorted turn in a coil made of wire as small as No. 40 wire. Further, our tester is simple in construction and extremely simple and convenient to operate. Our tester tests coils of different sizes, both for shorted turns and for open circuits, in a rapid and expeditious manner.

One object of our invention is to provide an improved coil tester which is more sensitive than coil testers of the prior art.

Another object of our invention is to provide an improved coil tester which is simple in construction and which is convenient to use.

A further object of our invention is to provide an improved coil tester for testing coils of different size, both for shorted turns and for open circuits, in a rapid and expeditious manner.

A still further object of our invention is to provide an improved coil tester which can detect a single shorted turn in a coil wound from very fine wire.

Other and further objects of our invention will appear from the following description.

In general, our invention contemplates the provision of a coil tester including a pair of oscillators, the tuned circuit of each of which has an oscillator coil wound on an air core. To test smaller coils for shorted turns we first tune the oscillators to the same frequency and compare the oscillator output voltages, for example, by means of an oscilloscope to produce a Lissajous figure. The core of a first one of the oscillator coils is of a diameter which permits one of these smaller coils being tested to be introduced therein. If the first coil has a shorted turn, the Lissajous figure is disturbed upon introduction of the coil into the first oscillator coil core, and the coil is rejected. The second oscillator coil core is large enough to admit larger coils. To test the larger coils we tune the oscillators to the same frequency with one of the larger coils in the second oscillator core. When this larger coil is removed, the Lissajous pattern is disturbed. A good larger coil having no shorted turns will re-establish a steady Lissajous pattern upon its introduction into the larger core. Any coil may be tested for an open circuit by shorting its leads before introducing it into the core and then introducing it into the core. If the coil is continuous, having no open circuit, a large change in frequency will be indicated on the oscilloscope.

In the accompanying drawing, which forms part of the instant specification and which is to be read in conjunction therewith, the figure is a schematic view of one form of our improved coil tester.

Referring now to the drawing, our coil tester includes a first oscillator tube indicated generally by the reference character 10 having a plate 12, a grid 14 and a cathode 16. The tuned circuit of oscillator tube 10 has series capacitor circuit including capacitors 18 and 20 and an inductance winding 22 connected in parallel with the series capacitor circuit. We connect this tuned circuit between the common or ground conductor 24 of our tester and one terminal of a coupling capacitor 26 connected to grid 14. For a reason which will be explained hereinafter we dispose the inductance winding 22 on an air core 28 which may, for example, be a paper tube having an inner diameter of approximately one-half inch. We connect a variable tuning or trimming capacitor 30 in parallel with the capacitor 20 to provide a means by which oscillator tube 10 may be tuned. We connect a grid leak resistor 32 between grid 14 and cathode 16 and we connect a cathode resistor 34 between the cathode 16 and ground conductor 24.

We provide our coil tester with a self-contained power supply including a transformer indicated generally by the reference character 36, the primary winding 38 of which is supplied with alternating current potential from any suitable source (not shown). We connect a full-wave rectifier made up of respective diodes, indicated generally by the reference characters 40 and 42, across the center-tapped secondary winding 44 of transformer 36. A filter, including parallel-connected capacitors 46 and 48 connected by a series resistor 50, reduces the ripple in the output voltage from the rectifier including diodes 40 and 42 to produce a suitable direct current voltage across a resistor 52. We connect the plate voltage supply conductor 54 of our tester to the positive terminal of resistor 52.

It will be seen that the arrangement thus far described is an oscillator of the Colpitts type connected to operate as a cathode follower. An oscillator of this type has a feed-back loop gain of greater than unity to sustain oscillations. We provide the oscillator tube 10 with a buffer amplifier tube, indicated generally by the reference character 56, for isolating the oscillator from the external circuit. Tube 56 has a plate 58 connected to plate voltage supply conductor 54 and a cathode 60 connected by a pair of voltage dividing resistors 62 and 64 to ground. A winding 66 connected between the grid 68 of tube 56 and ground conductor 24 is magnetically coupled with winding 22 to apply the output signal of the oscillator to the grid 68. While we have shown winding 66 as being carried by tube 28 at a location axially displaced from the location of winding 22, it is to be understood that in practice these windings are superimposed one upon the other on tube 28 to ensure good magnetic coupling between the windings. A coupling capacitor 70 connects the common terminal of resistors 62 and 64 to an output terminal 72. A conductor 73 connects terminal 72 to an input terminal 74 of an oscilloscope indicated generally by the reference character 76. Terminal 74 may be associated with either the horizontal or vertical deflecting plates of oscilloscope 76.

Our coil tester includes a second oscillator tube indicated generally by the reference character 78 having a plate 80, a grid 82 and a cathode 84. We connect the plate 80 to the plate voltage supply conductor 54 by means of conductors 86 and 112. A cathode resistor 88 connects the cathode 84 to ground. The tuned circuit of oscillator tube 78 includes an inductance winding 90 connected in parallel with a pair of series-connected capacitors 92 and 94. A conductor 96 connects the common terminal of capacitors 92 and 94 to the cathode 84 of tube 78. A coupling capacitor 98 connects the upper end of the tuned circuit, as viewed in the figure, to the grid 82 of tube 78. We connect a grid leak resistor 100 between grid 82 and conductor 96. The oscillator including tube 78 is of the same type as is the oscillator including tube 10. The feed-back loop of this oscillator has a gain which is greater than unity so that oscillations are sustained in the tuned circuit including inductance coil 90. We wind coil 90 on an air core provided by a paper tube or the like 102 indicated in phantom in the drawing. Tube 102 has an inner diameter of, for example, one inch to permit introduction into the core of coils being tested.

A winding 104 carried by tube 102 is connected to the grid 106 of a buffer amplifier tube, indicated generally by the reference character 108, by a conductor 110 to couple the output of the oscillator including tube 78 to buffer tube 108 which isolates the oscillator from the external circuit. Conductor 112 connects the plate 114 of tube 108 to the plate supply voltage conductor 54. A pair of series-connected voltage dividing resistors 116 and 118 connect the cathode 120 of tube 108 to ground conductor 24. A coupling capacitor 122 connects the common terminal of resistors 116 and 118 to an output terminal 124 of my tester. A conductor 126 connects terminal 124 to an input terminal 128 of oscilloscope 76. Terminal 128 is associated with the oscilloscope horizontal or vertical deflecting plates other than the pair of plates with which terminal 74 is associated.

Our coil tester is adapted to test both pickup coil windings and torquing windings of a gyroscope system. For example, the pickup windings, one of which is indicated generally in the figure by the reference character 130, are of a size which permits their introduction into the tube 28 forming the air core for oscillator 10. The torquing coil windings, one of which is indicated generally in the figure by the reference character 132, are of a size which permits their introduction into the tube 102 forming the air core for oscillator 78 which, as has been explained hereinabove, may be, for example, approximately twice the diameter of the tube 28.

In use of our coil tester to test a pickup coil, such as coil 130, we first tune both oscillators to the same frequency. We readily accomplish this by adjusting trimmer capacitor 30 associated with oscillator 10. This adjustment produces a Lissajous figure on the screen of the oscilloscope 76. If the frequencies are the same, the pattern will be some form of an ellipse. If the frequencies of the two oscillators are integral multiples of each other, other patterns appear on the oscilloscope screen, as is known in the art. After this frequency adjustment has been made we introduce one of the coil windings such as winding 130 into the tube 28. If the coil being tested contains a shorted turn, a current is induced in the shorted turn to produce a magnetic flux which disturbs the flux pattern of winding 22 to drive the oscillator 10 off the preset frequency to cause the Lissajous pattern on an oscilloscope 76 to roll or even to disappear entirely. In other words, introduction of a coil having a shorted turn into the core of winding 22 changes the effective inductance value of the winding to change the resonant frequency of the tuned circuit. The evidence on the oscilloscope screen of a change in frequency in the oscillator 10 indicates that the coil 130 is defective and must be rejected. If the coil does not include a shorted turn the Lissajous pattern on the oscilloscope will not be disturbed by the introduction of the coil 130 into the core of winding 22.

The torquing coils, such for example as the coil 132, are of a size such that they have sufficient interwinding capacity to drive the oscillator 78 off its preset frequency when they are introduced into the tube 102 forming the air core for winding 90. As a result, we test these coils in a somewhat different manner than that in which coils 130 are tested. To test a coil 132 we select a coil of known good quality and introduce it into the core of winding 90. We then adjust trimmer capacitor 30 to produce a Lissajous figure on an oscilloscope 76. When the coil 132 is removed from the core of winding 90, the Lissajous pattern rolls or disappears. Of the coils 132 being tested, good coils having no shorted turns re-establish a stable Lissajous pattern on the oscilloscope screen on being introduced into the core of winding 90. The interwinding capacitance of a bad coil 132 having shorted turns will be so affected that these coils will not re-establish the Lissajous figure.

By the means outlined hereinabove we are able to detect a single shorted turn of either a coil 130 or of a coil 132, even where the coils are wound from very fine wire. It is to be noted that we lay out the components of our tester on a chassis (not shown) to provide sufficient oscillator intercoupling to cause the oscillators to "lock on" the same frequency enough to prevent the oscilloscope pattern from continually rolling owing to very minor drifts in the oscillator.

Our coil tester also is adapted to test coils to determine whether a coil includes an open circuit. To accomplish this we first tune the oscillators to the same frequency to create a Lissajous pattern in the manner described hereinabove in connection with the testing of coils 130. When this has been done, a coil having two leads shorted may be introduced into either the core of winding 22 or winding 90. A good coil will produce a very large change in oscillator frequency, which will readily be apparent on the oscilloscope screen. A good coil may, if desired, be tested first to give an indication of the amount of change in the Lissajous figure which should occur during this test.

It will be seen that we have accomplished the objects of our invention. We have provided a coil tester which is more sensitive than testers of the prior art. Our tester is adapted to indicate a single shorted turn in a coil formed of very fine wire. Our tester is adapted to test coils both for shorted turns and for open circuits. Our tester rapidly and expeditiously tests a large number of small and large coils.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A tester for testing first coils having a certain diameter and for testing second coils having a diameter which is greater than said certain diameter including in combination a first oscillator comprising a tuned circuit having a winding with an air core of a diameter intermediate the respective diameters of said first and second coils to permit introduction of said first coils into said first oscillator winding while preventing introduction of said second coils into said first oscillator winding, a second oscillator comprising a tuned circuit having a winding with an air core of a diameter greater than the diameter of said second coils to permit introduction of said second coils into said second oscillator winding, means for tuning said first oscillator and said second oscillator and indicating means responsive to said oscillations for producing an indication of a difference in the frequencies of said oscillations.

2. A coil tester as in claim 1 in which said indicating means is adapted to produce a visual indication.

3. A coil tester as in claim 1 including respective buffer amplifiers and means for coupling the respective outputs of said oscillators to said buffer amplifiers.

4. A coil tester as in claim 1 including an integral power supply for said oscillators.

References Cited in the file of this patent

UNITED STATES PATENTS

| | | |
|---|---|---|
| Re. 23,368 | Grob et al. | May 22, 1951 |
| 2,047,617 | Conron | July 15, 1936 |
| 2,337,132 | Shaw | Dec. 21, 1943 |
| 2,393,717 | Speaker | Jan. 29, 1946 |
| 2,404,238 | Loughlin | July 16, 1946 |
| 2,576,173 | Cornelius | Nov. 27, 1951 |
| 2,580,670 | Gilbert | Jan. 1, 1952 |
| 2,600,396 | Ewen | June 17, 1952 |

OTHER REFERENCES

Alexander, Jr.: "Dielectric Constant Meter," Electronics, April 1945.

Chalfin: Electronic Industries, May 1946, page 77.